United States Patent
Lee

(10) Patent No.: US 10,430,651 B2
(45) Date of Patent: Oct. 1, 2019

(54) ELECTRONIC DEVICE INCLUDING IRIS CAMERA

(71) Applicant: SAMSUNG ELECTRONICS CO., LTD., Suwon-si, Gyeonggi-do (KR)

(72) Inventor: Jeongyeol Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 243 days.

(21) Appl. No.: 15/656,179

(22) Filed: Jul. 21, 2017

(65) Prior Publication Data

US 2018/0032813 A1   Feb. 1, 2018

(30) Foreign Application Priority Data

Jul. 29, 2016   (KR) .................. 10-2016-0096688

(51) Int. Cl.
*G06K 9/00*       (2006.01)
*H04N 5/225*      (2006.01)
(Continued)

(52) U.S. Cl.
CPC ....... *G06K 9/00604* (2013.01); *G06K 9/2027* (2013.01); *G06K 9/2036* (2013.01);
(Continued)

(58) Field of Classification Search
CPC ............................................... G06K 9/00604
(Continued)

(56) References Cited

U.S. PATENT DOCUMENTS 8,913,119 B2    12/2014 Choi et al.
2013/0089240 A1*   4/2013 Northcott ........... G06K 9/00604
                                                      382/117
(Continued)

FOREIGN PATENT DOCUMENTS

KR   10-2015-0014254   2/2015
KR   10-2015-0037628   4/2015
WO      2014/087425   6/2014

OTHER PUBLICATIONS

"Photobiological safety of lamps and lamp systems", International Standard, IEC 62471, Jul. 2006, 98 pages.

(Continued)

*Primary Examiner* — Yulin Sun
(74) *Attorney, Agent, or Firm* — Nixon & Vanderhye, P.C.

(57) ABSTRACT

According to various example embodiments of the present disclosure, an electronic device includes: a light source module comprising a light source and associated circuitry; an iris camera configured to capture an iris of a user using infrared rays radiated from the light source module; and a processor electrically connected with the light source module and the iris camera and configured to generate an image regarding the iris. When a user is located at a distance within a specified range from the electronic device, the light source module and the iris camera are arranged such that a distance between the light source module and the iris camera is between a first threshold distance and a second threshold distance, the first threshold distance for generating a retina reflection region to have a specified size in the image of the iris, which is obtained by detecting, by the iris camera, the infrared rays reflected from a user's retina, the second (Continued)

threshold distance for generating a darkest portion to be displayed in an iris region in the image of the iris to have specified luminance.

20 Claims, 14 Drawing Sheets

(51) Int. Cl.
  *G06K 9/20* (2006.01)
  *H04N 5/33* (2006.01)
  *H04N 5/247* (2006.01)

(52) U.S. Cl.
  CPC .......... *H04N 5/2256* (2013.01); *H04N 5/247* (2013.01); *H04N 5/33* (2013.01)

(58) Field of Classification Search
  USPC ........................................ 348/158
  See application file for complete search history.

(56) References Cited

U.S. PATENT DOCUMENTS

| | | |
|---|---|---|
| 2015/0049179 A1 | 2/2015 | Son et al. |
| 2015/0199008 A1 | 7/2015 | Kim et al. |
| 2015/0245767 A1 | 9/2015 | Northcott et al. |
| 2015/0304535 A1 | 10/2015 | Smits et al. |
| 2016/0139411 A1* | 5/2016 | Kang ................ G02B 27/0172 359/630 |

OTHER PUBLICATIONS

International Search Report and Written Opinion dated Nov. 16, 2017 in counterpart International Patent Application No. PCT/KR2017/008091.

* cited by examiner

| Distance (Cm) | Irradiance (W/m^2) @ duty | | | |
|---|---|---|---|---|
| | 0.3 | Allowed Time (Second) | 0.5 | Allowed Time (Second) |
| 1.0 | 6900 | 3 | 11500 | 1 |
| 1.1 | 5702 | 4 | 9504 | 2 |
| 1.2 | 4792 | 5 | 7986 | 2 |
| 1.3 | 4083 | 7 | 6805 | 3 |
| 1.4 | 3520 | 8 | 5867 | 4 |
| 1.5 | 3067 | 10 | 5111 | 5 |
| 1.6 | 2695 | 12 | 4492 | 6 |
| 1.7 | 2388 | 14 | 3979 | 7 |
| 1.8 | 2130 | 17 | 3549 | 8 |
| 1.9 | 1911 | 19 | 3186 | 10 |
| 2.0 | 1725 | | 2875 | 11 |
| 2.1 | 1565 | | 2608 | 13 |
| 2.2 | 1426 | | 2376 | 14 |
| 2.3 | 1304 | | 2174 | 16 |
| 2.4 | 1198 | | 1997 | 18 |

FIG.9

ELECTRONIC DEVICE INCLUDING IRIS CAMERA

CROSS-REFERENCE TO RELATED APPLICATION

The present application is based on and claims priority under 35 U.S.C. § 119 to an application filed in the Korean Intellectual Property Office on Jul. 29, 2016 and assigned Ser. No. 10-2016-0096688, the content of which is incorporated by reference in its entirety.

BACKGROUND

1. Technical Field

The present disclosure relates generally to an electronic device including an iris camera.

2. Description of Related Art

With the enhancement of information and communication technology, various security systems are required. Automated teller machines (ATMs) of banks require customers' identification information and fields for developing new technology like research facilities also require tightened security. To satisfy the demand for tightened security, various security technologies are developing. As users' unique information, not only passwords which are arbitrarily set by users but also a variety of information for identifying users, such as users' fingerprints, voices, hand writing, or the like, may be used.

In recent years, iris information is used as users' identification information and security technology using iris information is being studied. Iris patterns differ from person to person and even twins have different iris patterns, and also the iris has a characteristic that it is not changed for a lifetime. Therefore, security technology using iris information is now coming to be in the spotlight.

SUMMARY

Various example embodiments of the present disclosure provide an electronic device including an iris camera, a light source module (for example, an infrared light emitting diode (IR LED)), a proximity light sensor, and a camera module arranged at appropriate locations in the electronic device.

An example embodiment of the present disclosure may provide an electronic device. The electronic device includes: a light source module comprising light source circuitry and a light source; an iris camera configured to capture an iris using infrared rays radiated from the light source module; and a processor electrically connected with the light source module and the iris camera configured to generate an image regarding the iris. When a user is located at a distance within a specified range from the electronic device, the light source module and the iris camera may be arranged in such a way that a distance between the light source module and the iris camera is between a first threshold distance and a second threshold distance, the first threshold distance for generating a retina reflection region to have a specified size in the image of the iris, which is obtained by detecting, by the iris camera, the infrared rays reflected from a user's retina, the second threshold distance for generating a darkest portion to be displayed in an iris region in the image of the iris to have specified luminance.

BRIEF DESCRIPTION OF THE DRAWINGS

The above and other aspects, features and attendant advantages of the present disclosure will become more apparent and readily appreciated from the following detailed description, taken in conjunction with the accompanying drawings, in which like reference numerals refer to like elements, and wherein:

FIGS. 9 and 10 are diagrams illustrating example arrangements of a light source module and a proximity light sensor according to an example embodiment of the present disclosure;

DETAILED DESCRIPTION

Figure 1:
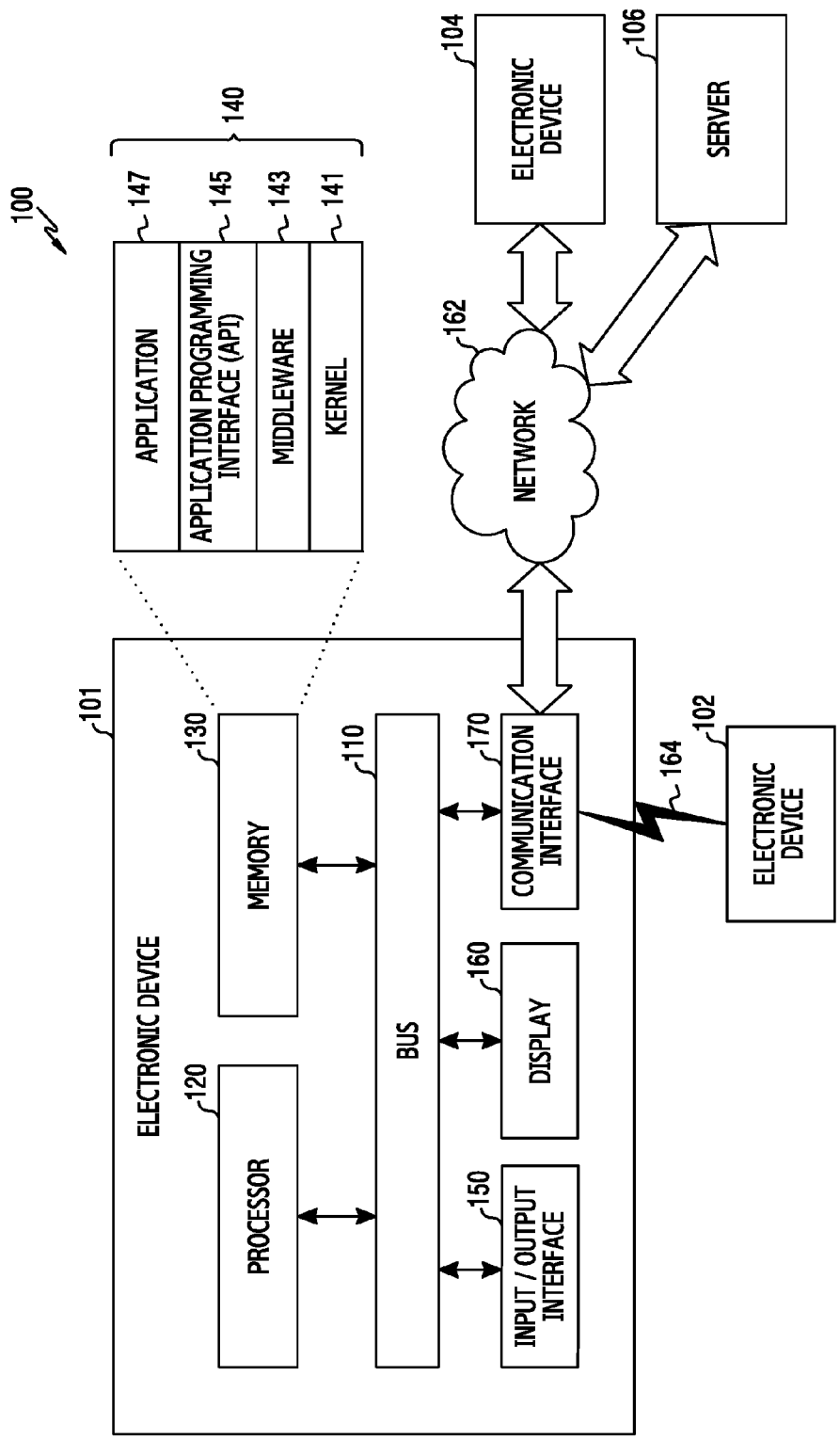
FIG. 1 is a diagram illustrating an environment of a network including an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". For example, the phrase "processor adapted (or configured) to perform A, B, and C" may refer to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing various example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output interface circuitry) 150, a display 160, and a communication interface (e.g., including communication circuitry) 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may include various input/output circuitry and may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may include various communication circuitry and may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106). Additionally, the communication interface 170 may provide a short-range wireless communication connection 164 between the electronic device and an external device (e.g., first electronic device 102).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
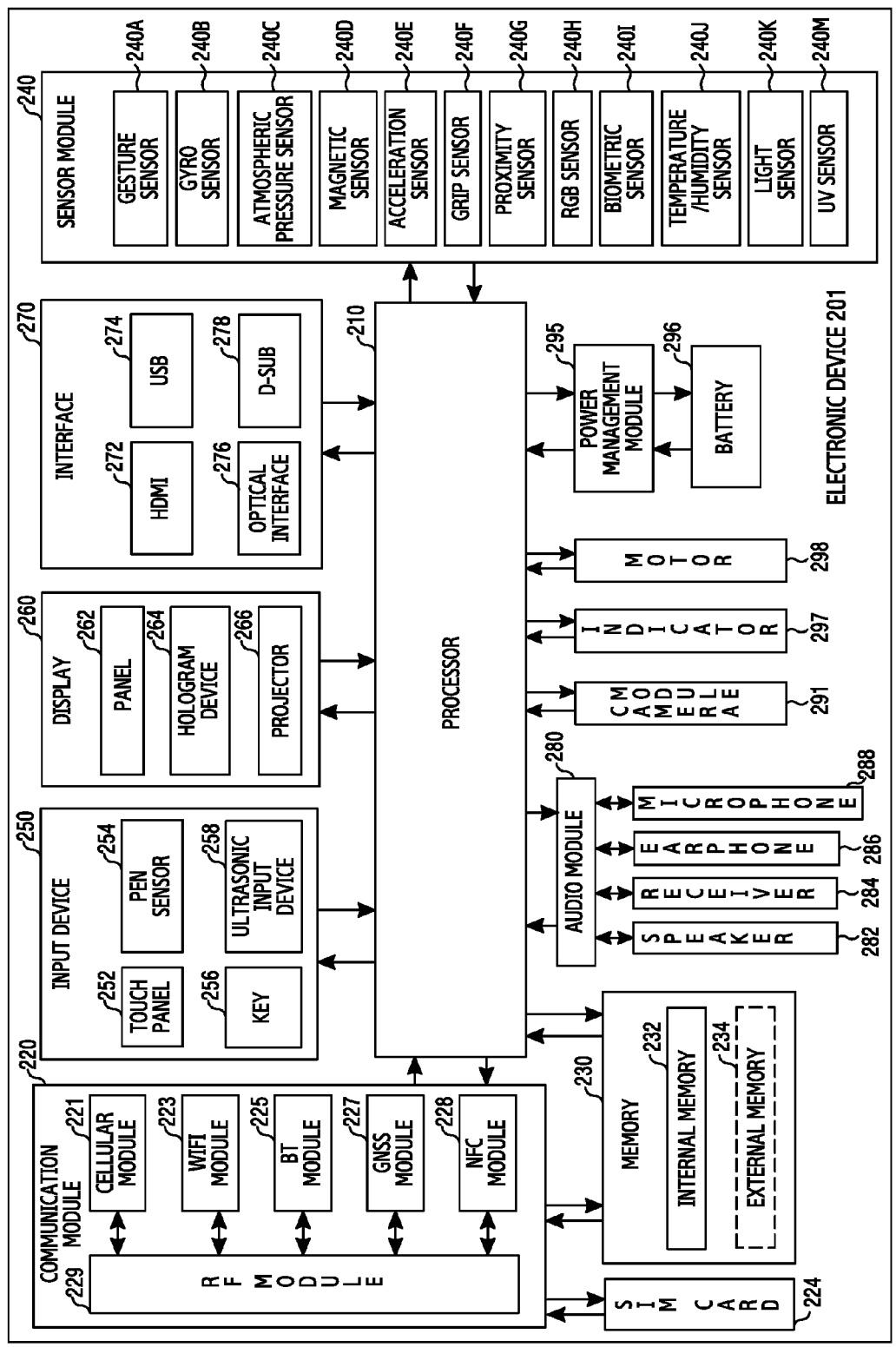
FIG. 2 is a block diagram illustrating an example electronic device according to various example embodiments of the present disclosure.

FIG. 2 is a block diagram illustrating an example electronic device according to various example embodiments of the present disclosure.

FIG. 2 is a block diagram of an electronic device 201 according to various embodiments. For example, the electronic apparatus 201 may include the whole or part of the electronic apparatus 101 illustrated in FIG. 1. The electronic device 201 may include at least one processor (e.g., Application Processor (AP)) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

In an embodiment, the processor 120 may include a processor to be described later in FIG. 4 (for example, a processor 460 of FIG. 4). For example, the processor 120 may receive information on the current impedance of the antenna, and perform an impedance matching operation at least partially based on the received information on the current impedance of the antenna.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna.

In an example embodiment, the RF module 229 may further include a plurality of matching circuits, sensors, and the like. For example, the plurality of matching circuits may include a first matching circuit 420 and a second matching circuit 430 of FIG. 4, which will be described later, as a configuration for matching the impedances of the antennas. For example, the sensor may sense a transmission signal transmitted from a Power amplifier module (PAM) and a reflection signal transmitted by the antenna, and may transmit the sensed transmission signal and reflection signal to the processor (e.g., processor 120). In an embodiment, the sensor may include a coupler. However, the present disclosure is not limited thereto.

According to another example embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor (e.g., a biometric sensor) 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
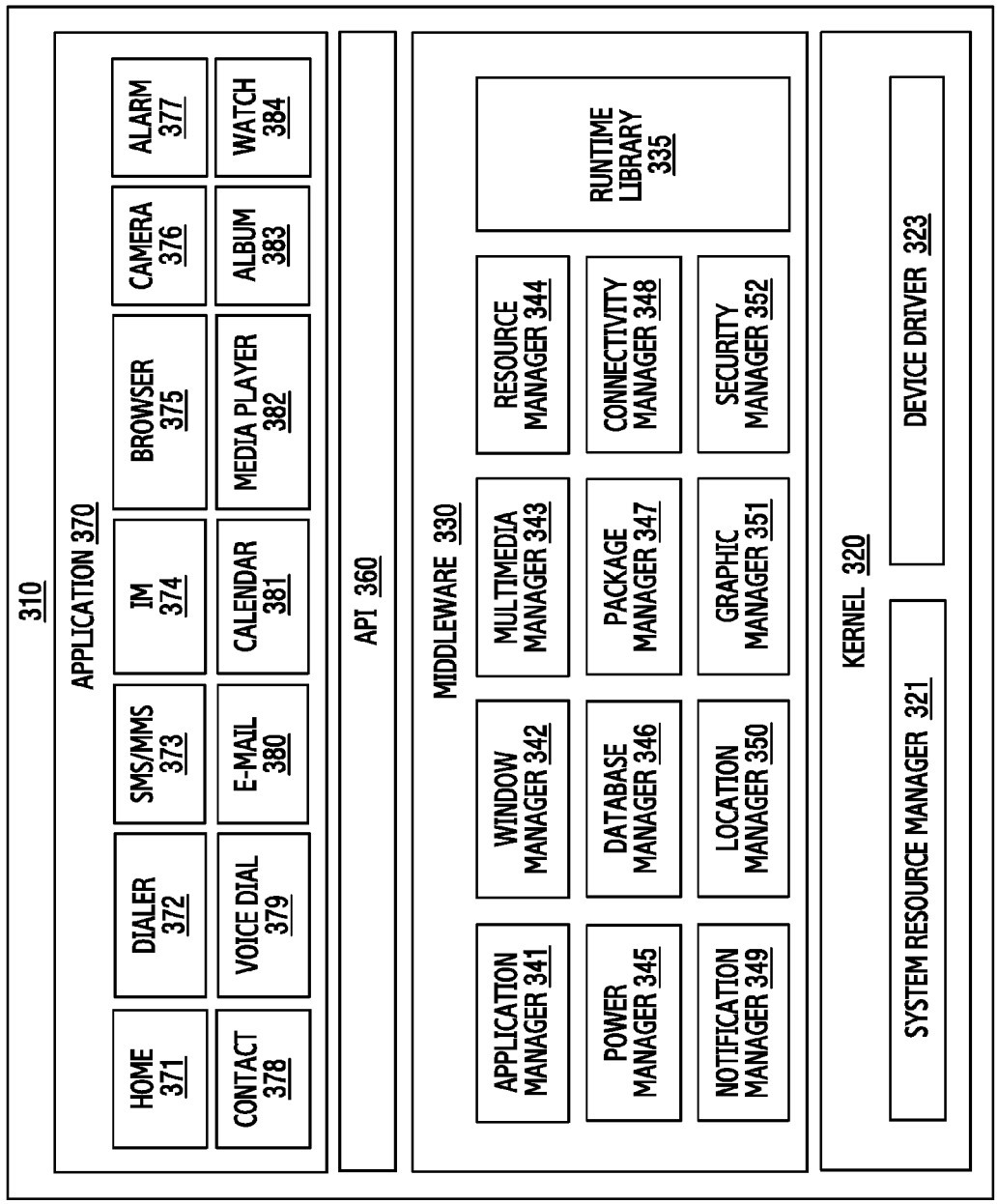
FIG. 3 is a block diagram illustrating an example program module according to various example embodiments.

FIG. 3 is a block diagram illustrating an example program module according to various example embodiments.

According to an example embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an example embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an example embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an example embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an example embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an example embodiment, the applications 370 may include applications (for example, a health care application of a mobile medical appliance or the like) designated according to attributes of the external electronic device 102 or 104. According to an example embodiment of the present disclosure, the application 370 may include an application received from the external electronic apparatus (e.g., the server 106, or the electronic apparatus 102 or 104). According to an example embodiment of the present disclosure, the application 370 may include a preloaded application or a third party application which can be downloaded from the server. Names of the elements of the program module 310, according to the above-described example embodiments of the present disclosure, may change depending on the type of OS.

According to various example embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The module or the program module, according to various example embodiments, may: include one or more elements described above; exclude some of them; or further include other elements. The operations performed by the module, the program module, or other elements, according to various example embodiments, may be executed in a sequential, parallel, iterative, or heuristic method. In addition, some operations may be executed in a different order, or may be omitted, or other operations may be added. In addition, the example embodiments disclosed in the present document are intended for the explanation and understanding of the technical matter, and shall not limit the scope of the technology described in the present document. Accordingly, the scope of the present disclosure should be construed to encompass all modifications or various other example embodiments based on the technical concept of the present disclosure.

In addition, the example embodiments disclosed in the present document are intended for the explanation and understanding of the disclosed technical matter, and shall not limit the scope of various example embodiments of the present document. Therefore, the scope of various example embodiments of the present document should be construed to encompass all modifications or various other example embodiments based on the technical concept of the various embodiments of the present disclosure.

Figure 4A:
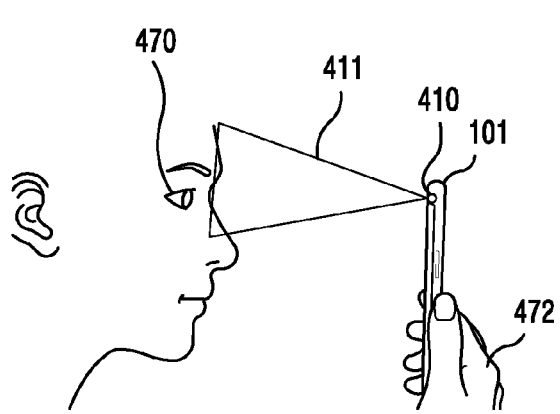
FIGS. 4A and 4B are diagrams illustrating an example electronic device including elements for acquiring an image regarding an iris according to an example embodiment of the present disclosure.
Figure 4B:
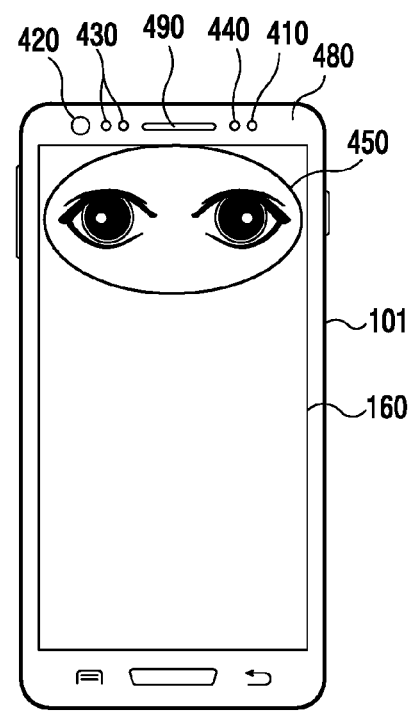

FIGS. 4A and 4B are diagrams illustrating an example electronic device including elements for acquiring an image regarding an iris according to an example embodiment of the present disclosure.

Referring to FIGS. 4A and 4B, the electronic device 101 may capture a region of an eye 470 including a user's iris using an iris camera 410 (or an iris recognition camera, an iris capturing camera, or the like). For example, as illustrated in FIG. 4A, the electronic device 101, which is being grasped by a user's hand 472, may capture the region of the eye 470 including the user's iris, which exists within a range 411 of an angle of view (FOV) of the iris camera 410, using the iris camera 410 or the like disposed at the upper end of the electronic device 101.

Referring to FIG. 4B, in an example embodiment, the electronic device 101 may include a proximity light sensor 430 and a front camera 440 in addition to the iris camera 410 and a light source module 420 which are related to an operation of acquiring an image regarding a user's iris. However, this should not be considered as limiting.

In an example embodiment, the light source module 420 may include various circuitry and elements configured to perform a light function for capturing an iris by radiating (or emitting) infrared rays. In an example embodiment, the light source module 420 may radiate infrared rays to the region of the user's eye 470 located at a distance of a specified range from the electronic device 101. For example, the light source module 420 may be disposed in such a way that the region of the user's eye 470 located at the distance of the specified range from the electronic device 101 falls within the radiation range (or light range) 411 of the light source module 420.

In an example embodiment, the light source module 420 may include, for example, and without limitation, at least one of an infrared light emitting diode (IR LED) and an IR laser diode (LD). However, this should not be considered as limiting. For example, the light source 420 may include any and all kinds of light sources that can radiate infrared rays.

In an example embodiment, the light source module 420 may further include a light source for radiating visible rays in addition to the light source for radiating infrared rays. In another embodiment, the light source module 420 may include only the light source for radiating visible rays in replacement of the light source for radiating infrared rays (for example, the IR LED or the IR LD).

In an example embodiment, the iris camera 410 may capture an image regarding at least a part of a user's face by detecting (or sensing) infrared rays which have been radiated from the light source module 420 and reflected from the at least part of the user's face including the eye 470. In an example embodiment, the image regarding the at least part of the user's face may include an image regarding the irises of user's both eyes. In another embodiment, the image regarding the at least part of the user's face may include only an image regarding the iris of one eye of the user.

In another example embodiment, the iris camera 410 may generate the image regarding the iris by detecting visible rays reflected from the region of the user's eye 470 region in addition to infrared rays. For example, when the light source module 420 including a visible ray light source radiates visible rays, the iris camera 410 may further include a visible ray sensor module for detecting visible rays reflected from the region of the user's eye 470, and may generate the image regarding the iris using the visible ray sensor. In an example embodiment, the iris camera 410 may include only the visible ray sensor in replacement of an infrared ray sensor.

In an example embodiment, the light source module 420 and the iris camera 410 may be arranged, spaced from each other by a distance of a specified range in the electronic device 101.

For example, the light source module 420 and the iris camera 410 may be arranged in such a way that a distance between the light source module 420 and the iris camera 410 is longer than a first threshold distance for making the size of a retina reflection region less than or equal to a specified size. The retina reflection region may refer to a region in the image regarding the iris that is generated by detecting, by the iris camera 410, infrared rays radiated from the light source module 420 and reflected from the retina of the user's eye. 470 (or eyeball).

In another example, the light source module 420 and the iris camera 410 may be arranged in such a way that the distance between the light source module 420 and the iris camera 410 is shorter than a second threshold distance for making the luminance of a darkest portion in an iris region of the iris image greater than or equal to specified luminance.

In still another example embodiment, the light source module 420 and the iris camera 410 may be arranged, spaced from each other by a distance between the first threshold distance and the second threshold distance.

The arrangements (or arrangement relationship) of the light source module 420 and the iris camera 410 which are spaced from each other by a distance within a specified range will be described in greater detail below with reference to FIGS. 5A to 8.

In yet another example embodiment, the light source module 420 and the iris camera 410 may be arranged at opposite locations with reference to the center of a receiver 490 (or speaker) disposed at the center of the upper end of the electronic device 101.

In a further example embodiment, the light source module 420 and the iris camera 410 may be arranged at opposite locations with reference to a line connecting the center of a guide 450, which is displayed on the display 160 in order to exactly capture the iris and guides the user to place user's both eyes 470. In an example embodiment, the guide 450 may be displayed on the upper end of the display 160 so as to guide the user's line of vision to face the guide 450 and the iris camera 410. However, this should not be considered as limiting.

In an example embodiment, the light source module 420 and the iris camera 410 may be implemented to have an angle of view (or a center line of an angle of view) tilted with respect to the front surface of the electronic device 101 by a specified angle so as to place user's both eyes within a range of an angle of view of the light source module 420 and a range of an angle of a view of the iris camera 410.

The arrangements of the light source module 420 and the iris camera 410 which are implemented to have their angles of view tilted with reference to the front surface of the electronic device by the specified angle will be described in greater detail below with reference to FIGS. 12 and 14.

In an example embodiment, the proximity light sensor 430 may include a proximity sensor for detecting whether the user approaches (or is within a predetermined distance of) the electronic device 101 or an illuminance sensor for detecting ambient luminance of the electronic device 101.

In an example embodiment, the electronic device 101 may measure or determine a distance between the electronic device 101 and the user (or a user's face or user's eye 470) using the proximity light sensor 430. In an example embodiment, when the measured distance between the electronic device 101 and the user falls within a specified distance, the electronic device (for example, the processor 120) may control the light source module 420 to reduce the intensity of infrared rays radiated from the light source module 420 or to stop radiating infrared rays in order to protect the user's eye 470.

In an example embodiment, the proximity light sensor 430 may be disposed within a predetermined distance from the light source module 420. In another example embodiment, the proximity light sensor 430 may be disposed adjacent to the light source module 420.

The arrangements of the proximity light sensor 430 and the light source module 420 (or distance between the proximity light sensor 430 and the light source module 420) will be described in greater detail below with reference to FIGS. 9 and 10.

In an example embodiment, the front camera 440 may capture various subjects located in front of the electronic device 101, including the front surface of the electronic device 101 and the user. In an example embodiment, the electronic device 101 may perform an authentication operation using an image regarding a user's face, which is acquired through the front camera 440. For example, the electronic device 101 may perform the authentication operation using an image regarding user's eyes, nose, lip or face shape, which is acquired through the front camera 440.

In an example embodiment, the electronic device 101 may perform complex authentication using the front camera 440 and the iris camera 410. For example, the electronic device 101 may authenticate the user using a face image acquired through the front camera 440 and may authenticate the user using an image regarding an iris acquired through the iris camera 410.

In an example embodiment, when the electronic device 101 performs the complex authentication, the front camera 440 and the iris camera 410 may be arranged at such locations (or distances) that an overlapping portion between a range of an angle of view of the front camera 440 and a range of an angle of view of the iris camera 410 is maximized. For example, the front camera 440 and the iris camera 410 may be arranged within a specified distance range or adjacent to each other. However, this should not be considered as limiting.

The arrangements of the front camera 440 and the iris camera 410 (or distance between the front camera 440 and the iris camera 410) will be described in detail with reference to FIG. 11.

In an example embodiment, the iris camera 410, the light source module 420, the proximity light sensor 430, and the front camera 440 may be arranged on the upper end of the electronic device 101. For example, the iris camera 410 and the light source module 420 are arranged on the upper end of the electronic device 101 such that the electronic device 101 can acquire a wide (or large) image regarding the region (or iris) of the user's eye 470 located on the upper portion of the face, in comparison to a case in which the iris camera 410 and the light source module 420 are arranged on the lower end of the electronic device 101. However, this should not be considered as limiting.

Figures 5A, 5B, 5C:
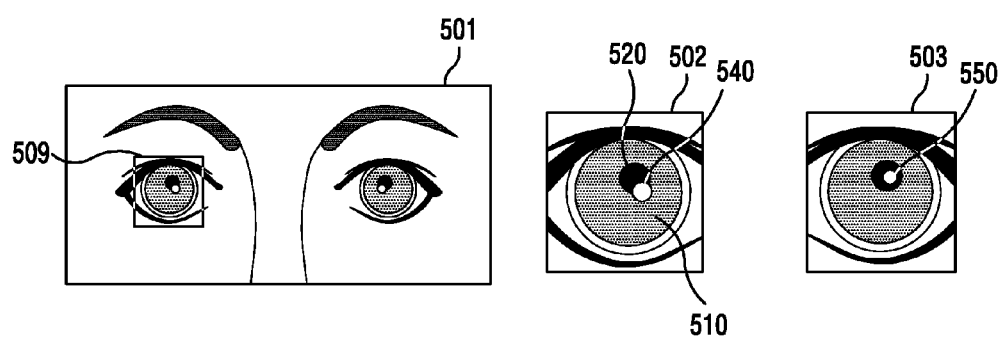
FIGS. 5A, 5B and 5C are diagrams illustrating an example retina reflection region which differs according to a distance between a light source module and an iris camera according to an example embodiment of the present disclosure.

FIGS. 5A, 5B and 5C are diagrams illustrating an example retina reflection region which differs according to a distance between a light source module and an iris camera according to an example embodiment of the present disclosure.

FIG. 5A is a diagram illustrating an example image 501 including at least a part of a face including user's both eyes, which is acquired using the iris camera.

FIG. 5B is a diagram illustrating an example image 502 regarding an eye region 509 of FIG. 5A which is acquired using the iris camera when the light source module and the iris camera are arranged adjacent to each other, and FIG. 5C is a diagram illustrating an example image 503 regarding the eye region 509 of FIG. 5A which is acquired using the iris camera when the light source module and the iris camera are arranged at specified distances.

Comparing FIGS. 5B and 5C, a retina reflection region 540 in the image 502 of FIG. 5B may include a part of a boundary (or a boundary line) between a pupil region 520 and an iris region 510. In an example embodiment, when the retina reflection region 540 includes a part of the boundary between the pupil region 520 and the iris region 510, the boundary between the pupil region 520 and the iris region 510 may not be exactly extracted. When the boundary between the pupil region 520 and the iris region 510 are not exactly extracted, the iris region 510 may not be exactly extracted.

In another example embodiment, the retina reflection region 540 in the image 502 of FIG. 5B may be wider than a retina reflection region 550 in the image 503. When the retina reflection region 540 is wide, a part of the retina reflection region 540 may overlap a part of the iris region. When a part of the retina reflection region 540 overlaps a part of the iris region 510, a pattern regarding the iris may not be extracted from the iris region 510 overlapping the retina reflection region 540 and thus it may be difficult to exactly authenticate the iris.

In an example embodiment, the light source module and the iris camera may be arranged at distances within such a range that the retina reflection region 550 does not overlap the iris region and the size of the retina reflection region 550 generated in the image 503 regarding the iris is made less than or equal to a specified size.

Figure 6:
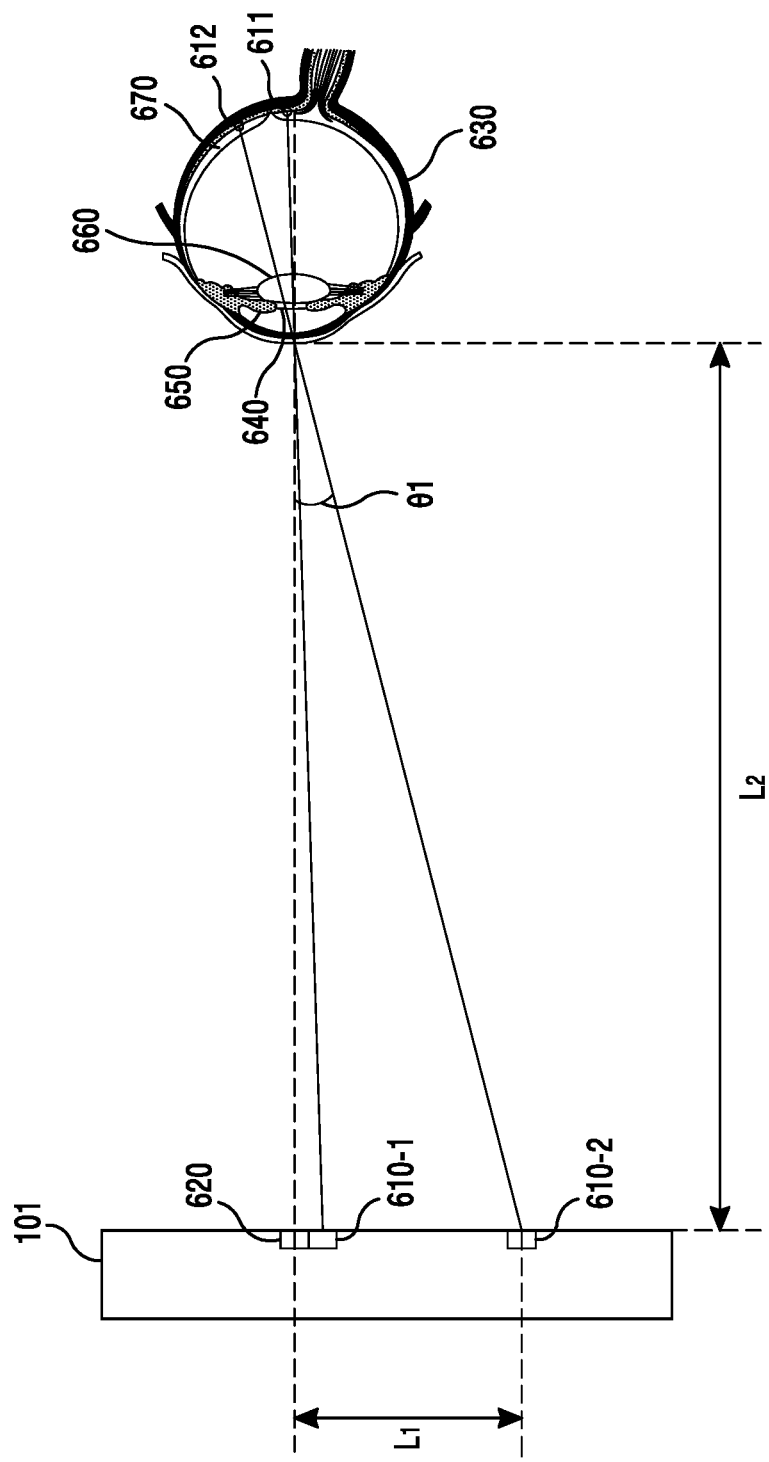
FIG. 6 is a diagram illustrating example arrangements of a light source module and an iris camera according to an example embodiment of the present disclosure.

FIG. 6 is a diagram illustrating example arrangements of a light source module and an iris camera according to an example embodiment of the present disclosure. For example, FIG. 6 is a diagram illustrating a principle that a size of a retina reflection region differs based on a distance between a light source module 620 and an iris camera 610, and arrangements of the light source module 620 and the iris camera 610.

In an example embodiment, in order to explain the principle that the size of the retina reflection region differs based on the distance between the light source module 620 and the iris camera 610, it is assumed that the iris camera 610-1 is disposed adjacent to the light source module 620 and the iris camera 610-2 is spaced from the light source module 620 by a specified distance L1 in a state in which the light source module 620 and a user's eye 630 (or eyeball) are placed horizontally to each other.

In an example embodiment, the iris camera 610-1 may detect a higher intensity infrared ray iris reflection pattern than the iris camera 610-2. For example, infrared rays radiated (or emitted) from the light source module 620 may pass through a crystalline lens 660 and may be reflected on a retina 670. According to a region (or location) of the retina 670 from which infrared rays are reflected, a part of the infrared rays reflected from the retina 670 reaches the iris camera 610-1, 610-2 through the crystalline lens 660, and the other part of the infrared rays reflected from the retina 670 does not pass through the crystalline lens 660 and is absorbed into the other region of the eye 630 and thus does not reach the iris camera 610-1, 610-2. In an example embodiment, the iris camera 610-1 may detect a retina reflection pattern of infrared rays reflected from a retina region 611, and the iris camera 610-2 may detect a retina reflection pattern of infrared rays reflected from a retina region 612. In an example embodiment, the retina region 611 may have a larger area than that of the retina region 612, and accordingly, the iris camera 610-1 may detect a higher intensity infrared ray retina reflection pattern than that of the iris camera 610-2.

In an example embodiment, when the iris camera 610-2 detecting a lower intensity infrared ray retina reflection pattern than that of the iris camera 610-1 is used, the electronic device 101 may generate a retina reflection region having a smaller size (or a smaller area) than when the iris camera 610-1 is used.

Based on the above-described principle, it can be understood that the electronic device 101 may generate a retina reflection region having a smaller size as the iris camera 610 is located farther from the light source module 620. In addition, when the user (or a user's face) is located at a specified distance ($L_2$) (for example, 30 cm) from the electronic device 101, an angle ($\theta_1$) (hereinafter, referred to as a "first angle") formed between a line connecting the light source module and the eye (or pupil 640) and a line connecting the iris camera 610 and the eye may increase as the distance of the iris camera 610 from the light source module 620 increases. Accordingly, when the electronic device 101 is designed to have a large first angle, the electronic device 101 may generate a retina reflection region having a small size.

In an example embodiment, the light source module 620 and the iris camera 610 may be arranged, spaced from each other by such a distance that the first angle is made greater than or equal to an angle (hereinafter, referred to as a "first threshold angle") that makes a retina reflection region have a specified size, for example, a maximum size, without overlapping a boundary between a pupil region and an iris region.

In an example embodiment, the first threshold angle may be 5°.

In an example embodiment, when the first threshold angle is 5°, the light source module 620 and the iris camera 610 may be arranged, spaced from each other by at least a distance which equals the distance between the light source module 620 and the eye multiplied by about tan (5°). However, the first threshold angle may vary according to a relative location of the user to the electronic device 101 or a design of the electronic device 101. For example, FIG. 6 illustrates a case in which the user has his/her iris 650 captured at a location that allows the center line of the radiation range of the light source module 620 to pass through the center of the pupil 640 of the user's eye. However, in practice, the user may have his/her iris 650 captured at a different location. When the location for capturing the iris 650 is changed, the first threshold angle may also be changed. In another example, in FIG. 6, the center line of the radiation range (or radiation angle) of the light source module 620 is perpendicular to the front surface of the electronic device 101. However, the light source module 620 may be implemented to have the center line of the radiation range thereof tilted with respect to the front surface of the electronic device 101 by a specified angle. When the light source module 620 is implemented to have the center line of the radiation range thereof tilted with respect to the front surface of the electronic device 101 by the specified angle, the first threshold angle may also be changed. However, this should not be considered as limiting.

Figure 7:
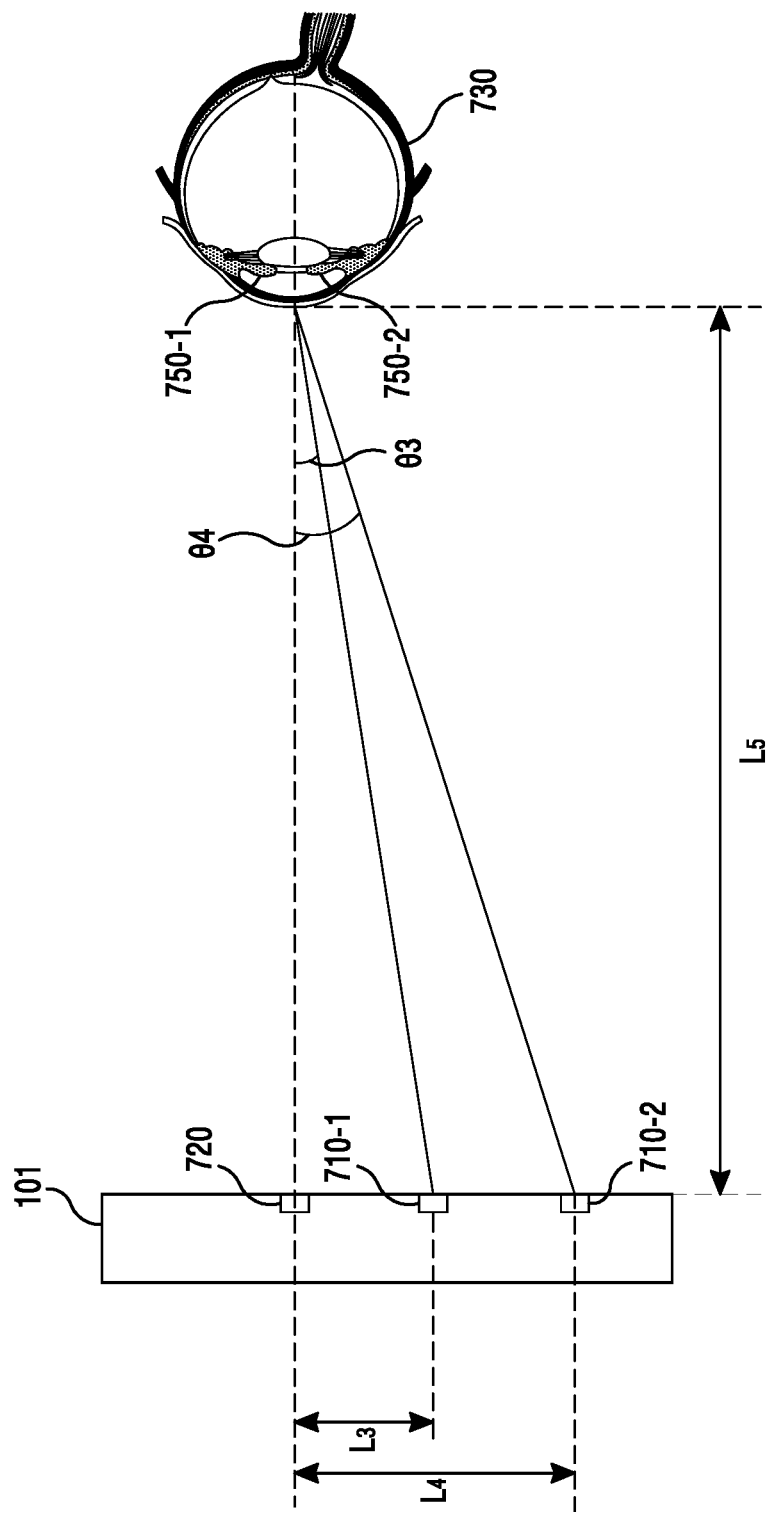
FIG. 7 is a diagram illustrating example arrangements of a light source module and an iris camera according to another example embodiment of the present disclosure.

FIG. 7 is a diagram illustrating example arrangements of a light source module and an iris camera according to another example embodiment of the present disclosure. For example, FIG. 7 is a diagram illustrating example arrangements of a light source module 720 and an iris camera for making the luminance of a dark portion in an iris region of an image regarding a user's iris greater than or equal to specified luminance according to a distance between the light source module and the iris camera.

Referring to FIG. 7, when it is assumed that a user's eye 730 is located at a specified distance ($L_5$) (or a fixed distance) from the electronic device 101 and the user's eye 730 has a spherical shape, the electronic device 101 may acquire a bright image regarding an iris part 750-2 of the iris that is located close to the iris camera, and may acquire a relatively dark image regarding an iris part 750-1 that is located relatively far from the iris camera, using the iris camera 710. In addition, comparing a case in which the iris camera 710-1 is spaced from the light source module 720 by a distance $L_3$ and a case in which the iris camera 710-2 is spaced from the light source module 720 by a distance $L_4$, the luminance of an image regarding the iris part 750-1 which is acquired using the iris camera 710-2 may be darker than the luminance of an image regarding the iris part 750-1 which is acquired using the iris camera 710-1. In an example embodiment, as the distance of the iris camera from the light source module 720 increases, the luminance (or luminance level) of an image regarding an iris part which is acquired using the iris camera may decrease. In addition, as the distance of the iris camera from the light source module 720 decreases, an angle (hereinafter, referred to as a "first angle") formed between a line connecting the light source module 720 and the eye 730 (or pupil) and a line connecting the iris camera and the eye 730 may have a small value. For example, when the light source module 720 and the iris camera 710-1 are spaced from each other by the distance $L_3$, the first angle may be $\theta_3$. In this case, when the light source module 720 and the iris camera 710-2 are spaced from each other by the distance $L_4$, which is longer than the distance $L_3$, the first angle may be $\theta_4$ which is larger than $\theta_3$. Accordingly, when the electronic device 101 is designed to have a small first angle, the electronic device 101 may generate an iris image that makes the luminance of a dark portion in an iris region of an image regarding the iris greater than or equal to specified luminance. In an example embodiment, the specified luminance may be luminance that enables a pattern of an iris to be extracted from a darkest portion to be displayed in an iris region of an image regarding an iris. However, this should not be considered as limiting.

In an example embodiment, the light source module 720 and the iris camera may be arranged, spaced from each other by such a distance that the first angle is made less than or equal to an angle (hereinafter, referred to as a "second threshold angle") that makes the luminance of a darkest portion in an iris region of an image of an iris greater than or equal to specified luminance.

In another example embodiment, the second threshold angle may be an angle that makes the size (or area) of the dark portion of the iris region in the image regarding the iris less than or equal to a specified size. For example, when the size of the dark portion of the iris region from which the pattern of the iris cannot be extracted is greater than or equal to the predetermined size, the electronic device 101 may have difficulty in authenticating the iris on the basis of an iris pattern which is extracted from the portions other than the dark portion of the iris region. The second threshold angle may be an angle that makes the size (or area) of the dark portion of the iris region less than or equal to the specified size in order to guarantee an iris region which is necessary for recognizing an iris (or which is specified to recognize an iris). However, this should not be considered as limiting.

In an example embodiment, the second threshold angle may be 11°.

In an example embodiment, when the second threshold angle is 11°, the light source module 720 and the iris camera 710 may be arranged, spaced from each other by at least a distance which equals the distance between the light source module 720 and the eye 730 multiplied by about tan (11°). However, the second threshold angle may vary according to a relative location of the user to the electronic device 101 or a design of the electronic device 101.

Figure 8:
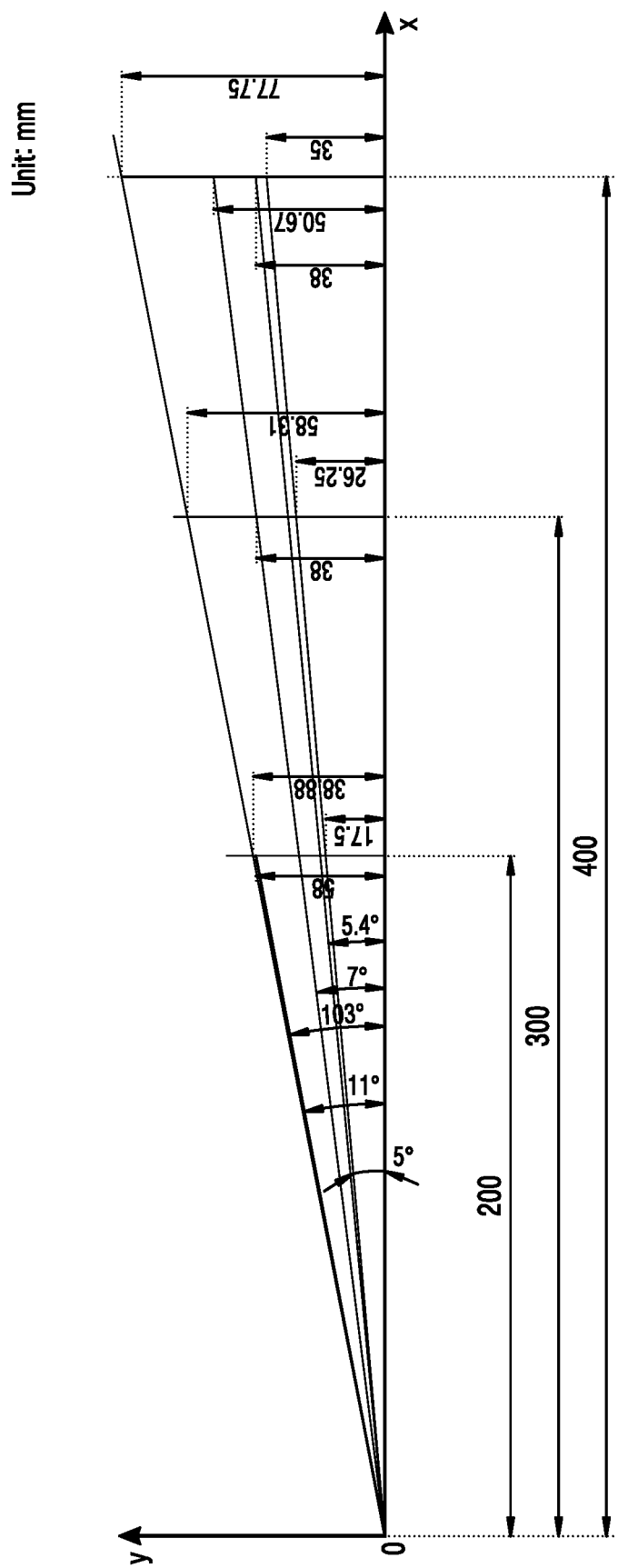
FIG. 8 is a diagram illustrating example arrangements of a light source module and an iris camera according to still another example embodiment of the present disclosure.

FIG. 8 is a diagram illustrating example arrangements of a light source module and an iris camera according to still another example embodiment of the present disclosure.

In an example embodiment, when the user is located at a distance of a specified range from the electronic device 101, the electronic device 101 may perform appropriate iris authentication. For example, when the user is located at a distance ranging from 20 cm to 40 cm (e.g., 200-400 mm) from the electronic device 101, the electronic device 101 may perform exact iris authentication on the basis of at least a part of an image acquired regarding the user's iris. In another example, when the user is located at a distance of 30 cm from the electronic device 101, the electronic device 101 may perform the most exact iris authentication based on at least a part of the image required regarding the user's iris. However, this should not be considered as limiting. For example, the distance of the specified range between the user and the electronic device 101 for appropriately authenticating the iris may vary according to arrangements or design of the elements of the electronic device 101 for acquiring an image regarding an iris, such as the light source module, the camera module, or the like.

In an example embodiment, as described above with reference to FIGS. 5A to 6, the light source module and the iris camera may be arranged, spaced from each other by such a distance that an angle (hereinafter, referred to as a "first angle") formed between a line connecting the light source module and an eye (or pupil) and a line connecting the iris camera and the eye is made greater than or equal to an angle (hereinafter, referred to as a "first threshold angle") that makes a retina reflection region have a specified size, for example, a maximum size, without overlapping a boundary between a pupil region and an iris region. In an example embodiment, the first threshold angle may be 5°.

In another example embodiment, as described above with reference to FIG. 7, the light source module and the iris camera may be arranged, spaced from each other by such a distance that the first angle is made less than or equal to an angle (hereinafter, referred to as a "second threshold angle") that makes the luminance of a darkest portion in an iris region of an image of an iris greater than or equal to specified luminance. In an example embodiment, the second threshold angle may be 11°.

In an example embodiment, the light source module and the iris camera may be arranged, spaced from each other by a distance of a range that makes the first angle greater than or equal to the first threshold angle and less than or equal to the second threshold angle. For example, the light source module and the iris camera may be arranged, spaced from each other by a distance of a range that makes the first angle greater than or equal to 5° and less than or equal to 11°.

Referring to FIG. 8, it is assumed that a user's eye is located at the origin (0), the iris camera is located on the x-axis, and the light source module has the same value as the iris camera on the x-axis and is spaced from the iris camera by a value on the y-axis.

In an example embodiment, when the user is spaced from the iris camera by 20 cm (200 mm), the light source module and the iris camera may be arranged between a distance (17.5 mm) corresponding to the first threshold angle of 5° and a distance (38.88 mm) corresponding to the second threshold angle of 11°.

In another embodiment, when the user is spaced from the iris camera by 40 cm, the light source module and the iris camera may be arranged between a distance (35 mm)

corresponding to the first threshold angle of 5° and a distance (77.75 mm) corresponding to the second threshold angle of 11°.

In an example embodiment, when the user performs iris authentication at a distance ranging from 20 cm to 40 cm from the iris camera, the light source module and the iris camera may be arranged, spaced from each other by a distance greater than or equal to 35 mm and less than or equal to 38.88 mm, which is an overlapping range between a range of a distance greater than or equal to 17.5 mm and less than or equal to 38.88 mm and a range of a distance greater than or equal to 35 mm and less than or equal to 77.75 mm, such that the first angle is made greater than or equal to the first threshold angle (for example, 5°) and less than or equal to the second threshold angle (for example, 11°) in the range from 20 cm to 40 cm. In another embodiment, when the user performs iris authentication at a distance ranging from 25 cm to 50 cm from the iris camera, the light source module and the iris camera may be arranged, spaced from each other by a distance greater than or equal to 43.74 mm and less than or equal to 48.60 mm, which is an overlapping range between a range of a distance greater than or equal to 21.87 mm and less than or equal to 48.60 mm and a range of a distance greater than or equal to 43.74 mm and less than or equal to 97.19 mm, such that the first angle is made greater than or equal to the first threshold angle (for example, 5°) and less than or equal to the second threshold angle (for example, 11°) in the range from 25 cm to 50 cm. However, this should not be considered as limiting. For example, the light source module and the iris camera may be arranged, spaced from each other by a distance corresponding to the range of the first threshold angle and the second threshold angle according to a distance of the user (or user's eye) from the electronic device. In addition, the first threshold angle is 5° and the second threshold angle is 11°, but this should not be considered as limiting. The light source module and the iris camera may be arranged, spaced from each other by a distance corresponding to the range of the first threshold angle and the second threshold angle according to the first threshold angle and the second threshold angle.

In an example embodiment, when the user is spaced from the iris camera by 30 cm, the first angle may be 7° and the light source module and the iris camera may be arranged, spaced from each other by 38 mm. When the light source module and the iris camera may be arranged, spaced from each other by 38 mm and the user is spaced from the iris camera by 20 cm, the first angle may be 10.8°. When the light source module and the iris camera are arranged, spaced from each other by 38 mm and the user is spaced from the iris camera by 40 cm, the first angle may be 5.4°. Accordingly, when the light source module and the iris camera are arranged, spaced from each other by 38 mm, the first angle may be greater than or equal to the first threshold angle and less than or equal to the second threshold angle.

Figure 10:
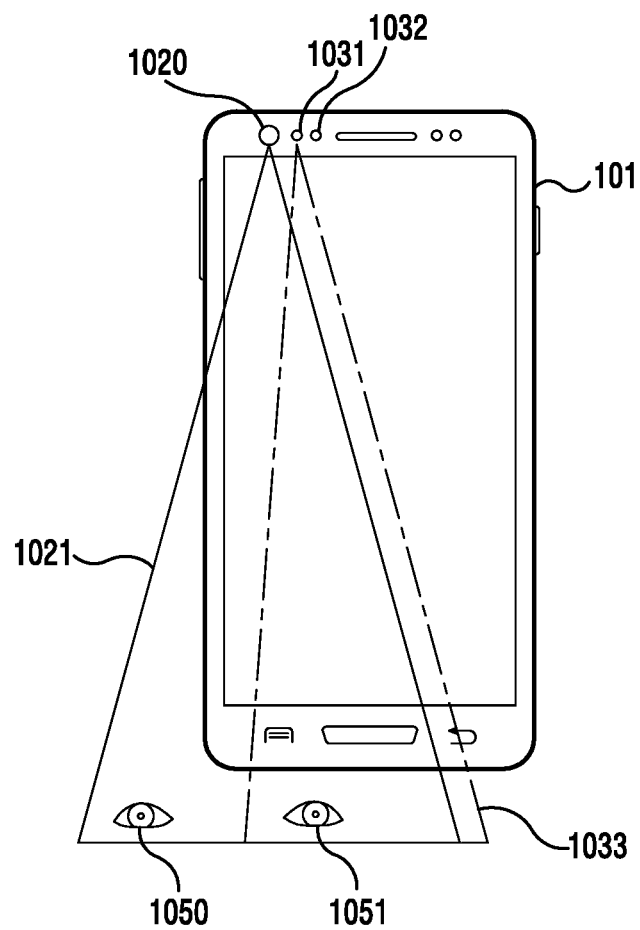

FIGS. 9 and 10 are diagrams illustrating example arrangements of a light source module and a proximity light sensor according to an example embodiment of the present disclosure.

Referring to FIGS. 9 and 10, the electronic device 101 may use a light source module 1020 which has a high output (or a high intensity) to more precisely recognize a user's iris at a long distance. However, when the intensity of outputted infrared rays increases, the light source module 1020 may give a direct stimulus to user's eyes. In addition, when the user's eyes are exposed to the infrared rays radiated from the light source module 1020 during longer than a specified time, the user's eyes may be damaged. There exist eye safety regulations to protect user's eye from infrared rays radiated from the light source module 1020.

FIG. 9 is a table showing irradiance and exposure times allowed to protect user's eyes according to a distance of the user from the electronic device 101 when a duty ratio of a light source (for example, an LED or a LD) of the light source module 1020 is 0.3 and 0.5.

For example, as shown in FIG. 9, when the duty ratio of the light source is 0.3 and a distance between the light source module 1020 and a user's eye is 1.5 cm, the irradiance may be 3067 (W/m$^2$) and an allowed exposure time for user's eyes may be 10 seconds. In another example, when the duty ratio of the light source is 0.5 and the distance between the light source module 1020 and the user's eye is 1.9 cm, the irradiance may be 3186 (W/m$^2$) and an allowed exposure time for user's eyes may be 10 seconds.

In an example embodiment, the electronic device 101 may measure a distance between the electronic device 101 and the user (or user's face or user's eyes) using a proximity light sensor 1031, 1032. In an example embodiment, when the measured distance between the electronic device 101 and the user falls within a specified distance, the electronic device 101 may reduce the intensity of infrared rays radiated from the light source module 1020 in order to protect the user's eyes. In another embodiment, when the measured distance between the electronic device 101 and the user falls within a specified distance, the electronic device 101 may turn off the light source module 1020 in order to prevent infrared rays from being radiated. However, this should not be considered as limiting.

In an example embodiment, the proximity light sensor 1031, 1032 may include a proximity sensor for detecting whether the user approaches the electronic device 101 and an illuminance sensor for detecting ambient luminance of the electronic device 101.

In an example embodiment, the proximity light sensor 1031, 1032 may be disposed within a specified distance from the light source module 1020. For example, the proximity light sensor 1031, 1032 may be disposed within 20 mm from the light source module 1020. In another embodiment, the proximity light sensor 1031, 1032 may be disposed adjacent to the light source module 1020.

In an example embodiment, as the proximity light sensor 1031, 1032 is closer to the light source module 1020, the electronic device 101 may exactly measure a distance from the light source module 1020 to the user's eye. For example, referring to FIG. 10, a radiation range 1021 of infrared rays radiated from the light source module 1020 and a radiation range 1033 of light (for example, infrared rays) radiated from a light emitter 1031 of the proximity light sensor 1031, 1032 may partially overlap each other. When the user's eye 1051 is located in the overlapping portion between the radiation range 1021 and the radiation range 1033, the electronic device 101 may measure an exact distance between the light source module 1020 and the user's eye 1051 using the proximity light sensor 1031, 1032. When the user's eye 1050 is located within the radiation range 1021 and located out of the radiation range 1033, the electronic device 101 may not measure an exact distance between the light source module 1020 and the user's eye 1050 using the proximity light sensor 1031, 1032. Accordingly, as the proximity light sensor 1031, 1032 is disposed adjacent to the light source module 1020 or closer thereto, the electronic device 101 may measure a more exact distance between the light source module 1020 and the user's eye using the proximity light sensor 1031, 1032. However, this should not be considered as limiting. For example, the proximity light sensor 1031, 1032 may be disposed within a specified distance from the light source module 1020 by considering a radiation direction of infrared rays radiated from the light source module 1020 and a radiation direction of light radiated from the proximity light sensor 1031, 1032, and the appearance of the electronic device 101 which is determined by a hole formed on the housing of the electronic device 101 to allow infrared rays radiated from the light source module 1020 to pass therethrough, and a hole formed on the housing of the electronic device 101 to allow light radiated from the proximity light sensor 1031, 1032 to pass therethrough.

Figure 11:
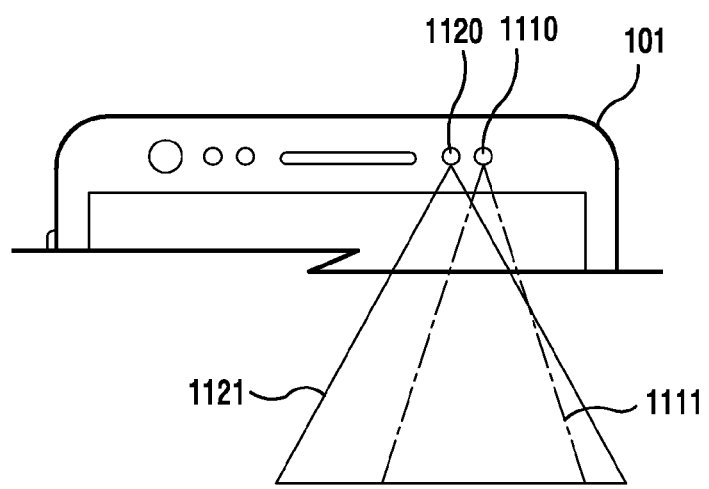
FIG. 11 is a diagram illustrating example arrangements of an iris camera and a front camera according to an example embodiment of the present disclosure.

FIG. 11 is a diagram illustrating example arrangements of an iris camera and a front camera according to an example embodiment of the present disclosure.

Referring to FIG. 11, in an example embodiment, the front camera 1120 may capture various subjects located in front of the electronic device 101, including a front surface of the electronic device 101 or a user. In an example embodiment, the electronic device 101 may perform an authentication operation using an image regarding a user's face which is acquired through the front camera 1120. For example, the electronic device 101 may perform the authentication operation using a user's eye, nose, lip, or facial shape acquired through the front camera 1120.

In an example embodiment, the electronic device 101 may perform complex authentication using the front camera 1120 and the iris camera 1110. For example, the electronic device 101 may authenticate the user using a face image acquired through the front camera 1120, and may authenticate the user using an image regarding an iris acquired through the iris camera 1110.

In an example embodiment, when the electronic device 101 performs complex authentication, the front camera 1120 and the iris camera 1110 may be arranged at such locations (or distances) that an overlapping range between a range of an angle of view 1121 of the front camera 1120 and a range of an angle of view 1111 of the iris camera 1110 can be maximized and/or improved. For example, considering a case in which the user (or user's face) vertically moves with reference to the front surface of the electronic device 101, there is a high possibility that the electronic device 101 can acquire an image regarding a user's face and an image regarding irises of user's both eyes, simultaneously, when the overlapping range between the range of the angle of view 1121 of the front camera 1120 and the range of the angle of view 1111 of the iris camera 1110 is maximized. As the possibility that the electronic device can acquire the image regarding the user's face and the image regarding the irises of the user's both eyes simultaneously increases, the complex authentication is more likely to succeed. However, this should not be considered as limiting.

In an example embodiment, the front camera 1120 and the iris camera 1110 may be arranged adjacent to each other such that the overlapping range between the range of the angle of view 1121 of the front camera 1120 and the range of the angle of view 111 of the iris camera 1110 can be maximized. However, this should not be considered as limiting. For example, the front camera 1120 may be disposed within a specified distance from the iris camera 1110 by considering a tilting direction of the angle of view (or a center line of the angle of view) of the front camera 1120 with respect to the electronic device 101, and a tilting direction of the angle of view (or a center line of the angle of view) of the iris camera 1110 with respect to the electronic device 101.

In an example embodiment, when the front camera 1120 and the iris camera 1110 are arranged adjacent to each other or arranged within a specified distance, the front camera 1120 and the iris camera 1110 may be connected with the processor 120 using one wire connecting from the front camera 1120 and the iris camera 1110 to the processor 120.

In another example embodiment, when the front camera 1120 and the iris camera 1110 are arranged adjacent to each other or within a specified distance, the front camera 1120 and the iris camera 1110 may be arranged on a single printed circuit board (PCB). However, this should not be considered as limiting.

Figure 12:
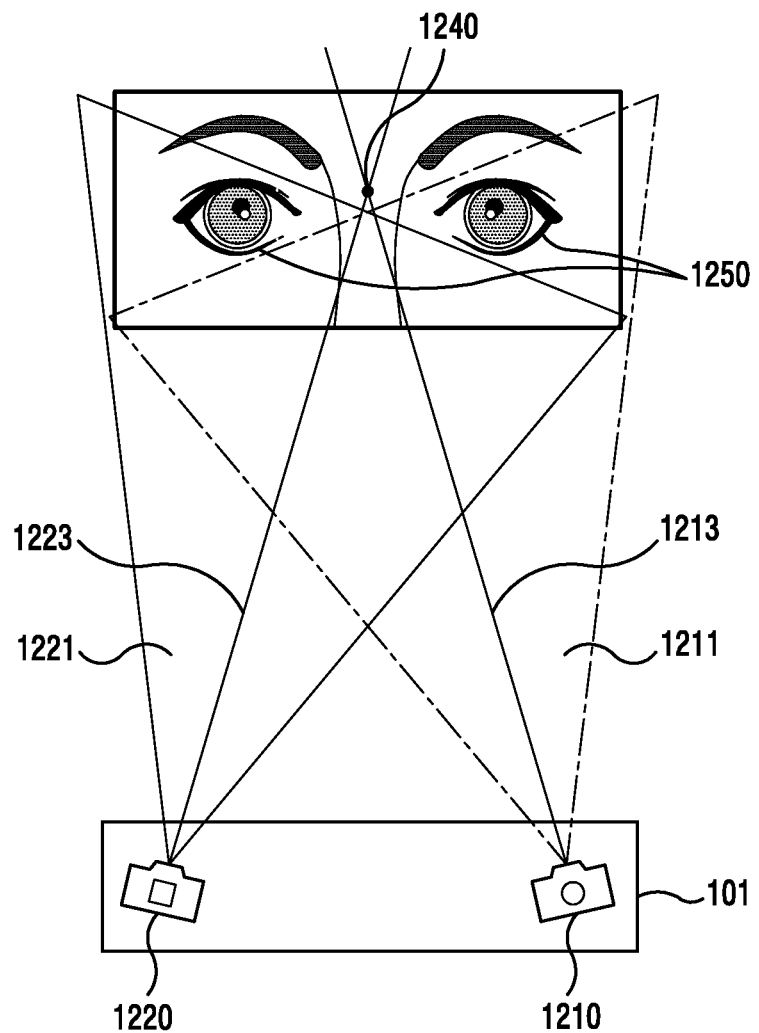
FIG. 12 is a diagram illustrating an example light source module and an example iris camera which are implemented to have angles of view of the light source module and the iris camera tilted by specified angles according to an example embodiment of the present disclosure.

FIG. 12 is a diagram illustrating an example light source module and an example iris camera which are implemented to have their angles of view tilted by specified angles according to an example embodiment of the present disclosure.

Referring to FIG. 12, the light source module 1220 may be implemented to have the angle of view of the light source module 1220 titled by a specified angle in order to include user's both eyes 1250 distanced from the electronic device 101 by a specified distance in a radiation range 1221. In another example, the iris camera 1210 may be implemented to have the angle of view of the iris camera 1210 tilted by a specified angle in order to include the user's both eyes 1250 distanced from the electronic device 101 by the specified distance in a range of an angle of view 1211 (or a range of a field of view).

In an example embodiment, the light source module 1220 and the iris camera 1210 may be implemented to have the angles of view of the light source module 1220 and the iris camera 1210 tilted by specified angles in order to cross the center lines 1223 and 1213 of the angles of view at a center point 1240 of the user's both eyes 1250 distanced from the electronic device 101 by a specified distance (for example, 30 cm). By doing so, the electronic device 101 may acquire an image regarding the iris more precisely.

Figure 13:
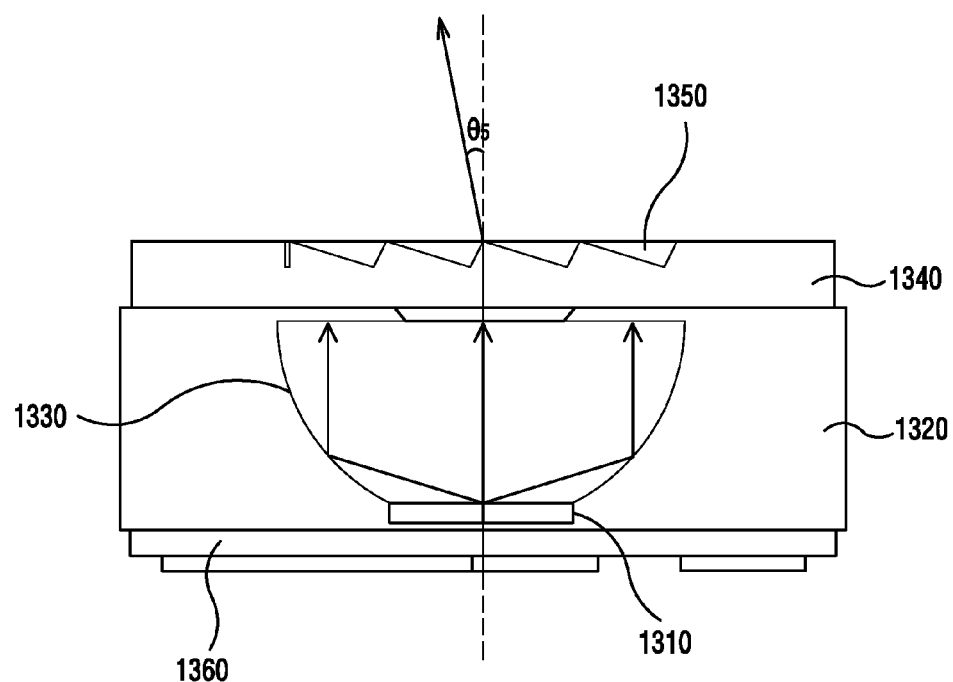
FIG. 13 is a diagram illustrating an example light source module according to an example embodiment of the present disclosure.

FIG. 13 is a diagram illustrating an example light source module according to an example embodiment of the present disclosure.

Referring to FIG. 13, the light source module may include various light source circuitry including, for example, and without limitation, a light source 1310, a bracket 1320, a reflector 1330, a lens 1340, and a PCB 1360.

In an example embodiment, the light source 1310 (or a light source integrated circuit (IC)) may include, for example, and without limitation, at least one of an IR LED and an IR LD. However, this should not be considered as limiting. For example, the light source module may further include a light source for radiating visible rays in addition to the light source 1310 for radiating infrared rays. In another example, the light source module may include only the light source for radiating visible rays in replacement of the light source for radiating infrared rays (for example, the IR LED or IR LD). In an example embodiment, the light source may be stacked on the PCB 1360. However, this should not be considered as limiting.

In an example embodiment, the bracket 1320 may support the light source module and accommodate the elements included in the light source module.

In an example embodiment, the reflector 1330 may allow infrared rays radiated from the light source 1310 to be collected at the lens 1340. For example, the reflector 1330 may allow infrared rays radiated from the light source 1310 in a conical shape with reference to the light source 1310 to enter the lens 1340 in a vertical direction.

In an example embodiment, the lens 1340 may allow the angle of infrared rays entering from the reflector 1330 to be tilted by a specified angle ($\theta_5$). For example, the lens 1340 may allow the angle of infrared rays entering from the reflector 1330 to be tilted by the specified angle ($\theta_5$) through a concavo-convex portion 1350. In an example embodiment, the lens 1340 may make the intensity of radiated infrared rays uniform by diffusing the infrared rays entering from the reflector 1330 using the concavo-convex portion 1350. However, this should not be considered as limiting.

In an example embodiment, the light source module may be implemented to have the angle of view of the light source module tilted by an angle ranging from from 2.5° to 3.5°. However, this should not be considered as limiting.

Figure 14:
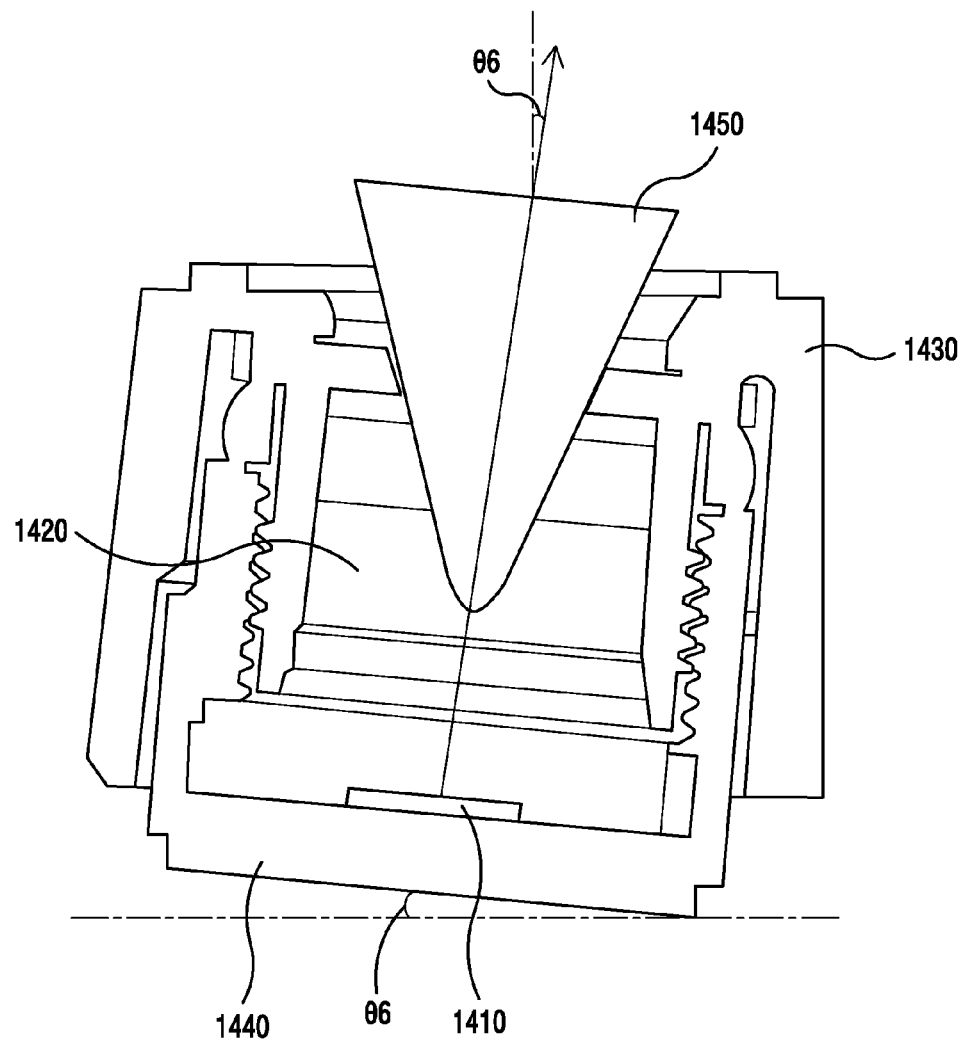
FIG. 14 is a diagram illustrating an iris camera module according to an example embodiment of the present disclosure.

FIG. 14 is a diagram illustrating an example iris camera module according to an example embodiment of the present disclosure.

Referring to FIG. 14, the iris camera module may include, for example, and without limitation, an image sensor 1410, a lens 1420, a bracket 1430, and a PCB 1440.

In an example embodiment, the image sensor 1410 may generate an image regarding an iris. For example, the image sensor 1410 may generate the image regarding the iris by detecting infrared rays reflected from a user's eye region and converting the detected infrared rays into an electric signal. In an example embodiment, the image sensor 1410 may be stacked on the PCB 1440. However, this should not be considered as limiting.

In an example embodiment, the lens 1420 may collect the infrared rays reflected from the user's eye region and forward the infrared rays to the image sensor 1410.

In an example embodiment, the bracket 1430 may support the iris camera module and accommodate the elements included in the iris camera module. In an example embodiment, the bracket 1430 may be implemented to have the image sensor 1410 and the lens 1420 tilted by a specified angle $\theta_6$. For example, the bracket 1430 may be implemented to have a tilt surface tilted with respect to the front surface of the electronic device 101 (or a window or glass of the electronic device 101) by the specified angle $\theta_6$.

In an example embodiment, when the bracket 1430 is implemented to have the tilt surface titled with respect to the front surface of the electronic device 101 (or the window or glass of the electronic device 101) by the specified angle $\theta_6$, the iris camera including the image sensor 1410 and the lens 1420 may be implemented to be titled with respect to front surface of the electronic device 101 by the specified angle $\theta_6$. In an example embodiment, the iris camera may be implemented to be titled with respect to the front surface of the electronic device 101 by about 4.5°. In an example embodiment, when the iris camera is implemented to be tilted with respect to the front surface of the electronic device 101 by about 4.5°, an angle of view 1450 (or a center line of the angle of view) of the iris camera may be tilted with respect to the front surface of the electronic device 101 by about 4.5°.

The electronic device including the iris camera according to various example embodiments of the present disclosure may acquire an image regarding an iris more exactly using the iris camera, the light source module (for example, the IR LED), the proximity light sensor, and the camera module which are arranged at appropriate locations in the electronic device, and perform a reliable user authentication on the basis of the acquired iris image.

According to various example embodiments of the present disclosure, an electronic device may include: a light source module comprising a light source and associated circuitry; an iris camera configured to capture an image of an iris using infrared rays radiated from the light source module; and a processor electrically connected with the light source module and the iris camera configured to generate an image regarding the iris. When a user is located at a distance within a specified range from the electronic device, the light source module and the iris camera may be arranged in such a way that a distance between the light source module and the iris camera is between a first threshold distance and a second threshold distance, the first threshold distance for generating a retina reflection region to have a specified size in the image of the iris, which is obtained by detecting, by the iris camera, the infrared rays reflected from a user's retina, the second threshold distance for generating a darkest portion to be displayed in an iris region in the image of the iris to have specified luminance.

In an example embodiment, the specified size may be a maximum size of the retina reflection region which does not overlap the iris region in the image regarding the iris.

In an example embodiment, the specified luminance may be luminance by which an iris pattern of the darkest portion to be displayed in the iris region is extractable.

In an example embodiment, the first threshold distance may be 35 mm and the second threshold distance may be 38.88 mm.

In an example embodiment, the distance between the light source module and the iris camera may be 38 mm.

In an example embodiment, the light source module may include an IR LED or an IR LD.

In an example embodiment, the light source module may further include a light source for radiating visible rays.

In an example embodiment, the light source module may be implemented to have a direction of an angle of view of the light source module titled with respect to a front surface of the electronic device by a specified angle.

In an example embodiment, the specified angle may be in a range of 2.5°-3.5° inclusive.

In an example embodiment, the light source module may further include a lens, and the lens may further include a concavo-convex portion which allows a direction of an angle of view of the light source module to be tilted with respect to a front surface of the electronic device by a specified angle.

In an example embodiment, the iris camera may be implemented to have an angle of view of the iris camera tilted with respect to a front surface of the electronic device by a specified angle.

In an example embodiment, the iris camera may be implemented to have a direction of the angle of view of the iris camera tilted with respect to the front surface of the electronic device by 4.5°.

In an example embodiment, the iris camera may be accommodated in a bracket which is titled by the specified angle.

In an example embodiment, the electronic device may further include a proximity light sensor including a proximity sensor and an illuminance sensor, for measuring a distance between the electronic device and the user.

In an example embodiment, when the distance between the electronic device and the user, which is measured by the proximity light sensor, is a specified distance, the processor may turn off the light source module.

In an example embodiment, the processor may control the light source module to reduce an intensity of infrared rays radiated from the light source module as the distance between the electronic device and the user, which is measured by the proximity light sensor, is shorter.

In an example embodiment, the proximity light sensor may be disposed at a distance within a range of 20 mm or less from the light source module.

In an example embodiment, the proximity light sensor may be disposed adjacent to the light source module.

In an example embodiment, the electronic device may further include a front camera disposed on a front surface of the electronic device, for acquiring an image regarding a subject, and the electronic device may perform complex authentication regarding a user using the front camera and the iris camera.

In an example embodiment, the front camera may be disposed adjacent to the iris camera or within a specified distance from the iris camera.

In addition, the structure of data used in the above-described embodiments may be recorded on a computer-readable recording medium through various means. The computer-readable recording medium includes a storage medium such as a magnetic storage medium (for example, a read only memory (ROM), a floppy disk, a hard disk, or the like) or an optical reading medium (for example, a compact disc-ROM (CD-ROM), a digital versatile disc (DVD)).

While various example embodiments of the present disclosure have been described in the detailed description of the present disclosure, it will be understood by those of ordinary skill in the art that various changes can be made within a limit without departing from the scope of the present disclosure. Therefore, the scope of the present disclosure should not be limited to and defined by the above-described example embodiments, and is instead defined not only by the appended claims but also by equivalents of the scope of the claims.

What is claimed is:

1. An electronic device comprising:
    a light source module comprising a light source and associated circuitry;
    an iris camera configured to capture an image of an iris using infrared rays radiated from the light source module; and
    a processor electrically connected with the light source module and the iris camera and configured to generate an image regarding the iris, and
    wherein, the light source module and the iris camera are arranged such that a distance between the light source module and the iris camera is between a first threshold distance and a second threshold distance, the first threshold distance being for generating a retina reflection region having a specified size in the image of the iris obtained by detecting, by the iris camera, the infrared rays reflected from the retina, the second threshold distance being for generating a darkest portion to be displayed in an iris region in the image of the iris having a specified luminance.

2. The electronic device of claim 1, wherein the specified size is a maximum size of the retina reflection region which does not overlap the iris region in the image regarding the iris.

3. The electronic device of claim 1, wherein the specified luminance is a luminance by which an iris pattern of the darkest portion to be displayed in the iris region is extractable.

4. The electronic device of claim 1, wherein the first threshold distance is 35 mm and the second threshold distance is 38.88 mm.

5. The electronic device of claim 1, wherein the distance between the light source module and the iris camera is 38 mm.

6. The electronic device of claim 1, wherein the light source of the light source module comprises at least one of an IR LED or an IR LD.

7. The electronic device of claim 1, wherein the light source is configured to radiate visible rays.

8. The electronic device of claim 1, wherein the light source module is configured to have a direction of an angle of view titled with respect to a front surface of the electronic device by a specified angle.

9. The electronic device of claim 8, wherein the specified angle is in a range of 2.5°-3.5° inclusive.

10. The electronic device of claim 1, wherein the light source module further comprises a lens, and
    wherein the lens further comprises a concavo-convex portion configured to allow a direction of an angle of view of the light source module to be tilted with respect to a front surface of the electronic device by a specified angle.

11. The electronic device of claim 1, wherein the iris camera is configured to have an angle of view tilted with respect to a front surface of the electronic device by a specified angle.

12. The electronic device of claim 11, wherein the iris camera is configured to have a direction of the angle of view tilted with respect to the front surface of the electronic device by 4.5°.

13. The electronic device of claim 11, wherein the iris camera is disposed in a bracket which is titled by the specified angle.

14. The electronic device of claim 1, further comprising a proximity light sensor comprising a proximity sensor and an illuminance sensor configured to determine a distance between the electronic device and the user.

15. The electronic device of claim 14, wherein, when the distance between the electronic device and a user, which is measured by the proximity light sensor, is a specified distance, the processor is configured to turn off the light source module.

16. The electronic device of claim 14, wherein the processor is configured to control the light source module to reduce an intensity of infrared rays radiated from the light source module as the distance between the electronic device and the user, which is measured by the proximity light sensor, becomes shorter.

17. The electronic device of claim 14, wherein the proximity light sensor is disposed at a distance within a range of 20 mm or less from the light source module.

18. The electronic device of claim 14, wherein the proximity light sensor is disposed adjacent to the light source module.

19. The electronic device of claim 1, further comprising a front camera disposed on a front surface of the electronic device, and configured to acquire an image regarding a subject, and
    wherein the electronic device is configured to perform complex authentication regarding a user using the front camera and the iris camera.

20. The electronic device of claim 19, wherein the front camera is disposed adjacent to the iris camera or within a specified distance from the iris camera.

* * * * *